United States Patent [19]

Reinhart, Jr.

[11] 4,238,379

[45] Dec. 9, 1980

[54] WATER BASED OLIGOMERIC PRIMERS FOR ALUMINUM AND ALUMINUM ALLOYS

[76] Inventor: Theodore J. Reinhart, Jr., 345 Forrer Blvd., Dayton, Ohio 45419

[21] Appl. No.: 43,575

[22] Filed: May 29, 1979

[51] Int. Cl.³ .......................... C08G 8/10; C08G 8/22
[52] U.S. Cl. ................................. 260/29.3; 428/436; 428/460; 528/155; 528/165
[58] Field of Search ....................... 260/29.3; 428/460; 528/155, 165

[56] References Cited

U.S. PATENT DOCUMENTS 3,823,103   7/1974   Harding .............................. 260/17.2

FOREIGN PATENT DOCUMENTS 49-12590   3/1974   Japan .
1322381   7/1973   United Kingdom .

Primary Examiner—Theodore E. Pertilla
Attorney, Agent, or Firm—Joseph E. Rusz; Cedric H. Kuhn

[57] ABSTRACT

A primer, particularly for aluminum and aluminum alloys, that is free of alkaline materials and consists essentially of an aqueous solution of a water soluble condensation product of (1) phenol, resorcinol or a mixture of phenol and resorcinol and (2) formaldehyde.

10 Claims, No Drawings

WATER BASED OLIGOMERIC PRIMERS FOR ALUMINUM AND ALUMINUM ALLOYS

RIGHTS OF THE GOVERNMENT

The invention described herein may be manufactured and used by or for the Government of the United States for all governmental purposes without the payment of any royalty.

FIELD OF THE INVENTION

This invention relates to water soluble oligomeric adhesion primers and protective coatings for aluminum. In one aspect it relates to a process for preparing the primers and coatings.

BACKGROUND OF THE INVENTION

Conventional adhesion primers for adhesives and paints are usually low solids content polymer solutions in an organic solvent such as methylethylketone or various other hydrocarbon and chlorinated hydrocarbon solvents. In the process of depositing the primers on adherends, large amounts of solvents must be evaporated and released into the atmosphere. The released solvents are a contributing factor to the pollution problems that are prevalent in many areas of the country.

In U.S. Pat. No. 3,823,103, aqueous dispersions are disclosed that contain a heat-hardenable phenolic resin. The dispersions are prepared by refluxing a mixture of a phenol and an aldehyde in an aqueous reaction medium containing an alkaline catalyst to produce a phenolic resin and then adding a mixture of gums to the mixture. The dispersions are indicated to be useful in applications wherein mineral fibers are sprayed with the dispersions and subsequently formed into mineral fiber batts. The dispersions described in the patent would be unsuitable for use as primers for several reasons, including the presence of a corrosive alkaline material and the insolubility of the phenolic resin in the aqueous medium.

It is a principal object of this invention to provide water soluble oligomeric primers which can be used to replace organic solvent based primers.

Another object of the invention is to provide water soluble phenol-formaldehyde and resorcinol-formaldehyde oligomers that are effective as adhesion primers for the adhesive bonding of aluminum alloys and as protective coatings for aluminum.

A further object of the invention is to provide a process for preparing the primer formulations.

Other objects and advantages of the invention will become apparent to those skilled in the art upon consideration of the accompanying disclosure.

SUMMARY OF THE INVENTION

The present invention resides in a primer for aluminum and aluminum alloys consisting essentially of an aqueous solution of a water soluble condensation product of (1) phenol, resorcinol or a mixture of phenol and resorcinol and (2) formaldehyde. The aqueous solution generally contains about 5 to 15 weight percent of the condensation product although smaller and larger amounts can be used. The method of applying the primer to the aluminum adherends is to a great extent determinative of the amount of condensation product contained in the solution. Thus, in spray applications a smaller amount, e.g., about 5 weight percent, is utilized whereas in dipping operations larger amounts, e.g., 10 weight percent and greater, can be tolerated.

The water soluble oligomeric adhesion primers are applied to aluminum structures directly from the aqueous solution. Conventional techniques are used, such as dipping, spraying or brushing, so as to obtain a coating or layer of desired thickness. The primers are then dried and cured at room temperature for a period ranging from about 4 to 24 hours. The drying and curing operation can also be accomplished by heating the primed adherend at an elevated temperature, e.g., at a temperature ranging from about 120° F. to 250° F., for a period of about one-half to 2 hours. During the curing operation, the water evaporates, leaving a coating of the cured oligomers bonded to the aluminum surfaces. Evaporation of the water into the atmosphere poses no pollution problems and also eliminates potential fire and toxicity hazards involved with the use of primers based on organic solvents.

In one embodiment, the present invention is concerned with a process for preparing the primer. In carrying out the process, phenol or resorcinol or a mixture of phenol and resorcinol are reacted with formaldehyde in a water medium. The usual procedure is to add the phenolic material to Formalin, a 27 to 40 percent formaldehyde solution. The reaction is preferably carried out at room temperature for a period ranging from about 1 to 3 hours. However, it is within the purview of the invention to utilize higher temperatures, e.g., up to 150° F. to 175° F., for shorter reaction periods, e.g., 30 minutes to 1 hour. In any event reaction conditions are avoided, such as reflux conditions, that might result in the formation of a dispersion of resinous material. At the end of the reaction period, the water soluble reaction mixture is usually diluted with water to provide a solution containing a desired amount of condensation product.

The process is preferably carried out in the absence of a catalyst. It is particularly important to exclude the presence of alkaline catalysts since such materials have a corrosive effect on aluminum. However, it is within the scope of the invention to utilize a catalytic amount of a catalyst, such as ammonium hydroxide or phosphoric acid, which does not corrode aluminum.

Equimolar amounts of formaldehyde and phenolic material can be used in the process. However, it is usually preferred to employ an excess of one or the other of the reactants. Thus, the mole ratio of formaldehyde to phenolic material usually ranges from about 0.55 to 1.4:1. When a catalyst is used, the amount generally ranges from about 0.05 to 0.15 mole per mole of total reactants.

It is usually preferred to include a wetting agent in the reaction medium. A particularly suitable material is polyvinyl alcohol which functions effectively in reducing surface tension. The amount of polyvinyl alcohol used ranges from about 1 to 10 weight percent, based upon the weight of the reactants. It is also within the scope of the invention to add to the reaction mixture an anti-corrosion agent, such as guanadine dichromate, acetoguanadine dichromate or 2,4-diamino-s-triazine. The amount added can range from about 1 to 25 weight percent, preferably 5 weight percent, based upon the weight of the reactants.

As intimated above, the condensation product of the phenolic material and formaldehyde is an oligomer or mixture of oligomers which is soluble in the aqueous medium. The oligomers have a molecular weight such that they are soluble in the aqueous medium. In general, the oligomers are usually dimers or trimers that have a molecular weight in the range of 154 to 426. Upon curing, free methylol groups undergo crosslinking reactions to form an insoluble polymeric coating on the aluminum adherends.

A more comprehensive understanding of the invention can be obtained by referring to the following illustrative examples which are not intended, however, to be unduly limitative of the invention.

EXAMPLE I

A run was conducted in which resorcinol (44.8 g; 0.4 mole) was reacted in an aqueous medium with formaldehyde (24 g of 37% Formalin; 0.3 mole). The reaction was carried out at room temperature while stirring the reaction mixture. After 2 hours the reaction mixture was diluted with water to provide a solution containing 10 weight percent oligomer. Also, additional formaldehyde (0.3 mole) and hydrolyzed polyvinyl alcohol (1 g; 0.005 mole) were added with stirring to form the primer solution.

EXAMPLE II

The run described in Example I was repeated except that a water soluble anti-corrosion agent was added. Thus, guanadine dichromate (0.5 g; 0.001 mole) was added to the primer solution along with the polyvinyl alcohol.

EXAMPLE III

The run described in Example I was repeated except that phosphoric acid was included as a catalyst in the reaction mixture. Thus, phosphoric acid (4 g; 0.1 mole) was added to the reaction medium containing resorcinol and formaldehyde.

EXAMPLE IV

A run was carried out in which resorcinol (44.8 g; 0.4 mole) was reacted with formaldehyde (42 g of 37% Formalin; 0.52 mole) in an aqueous medium. The reaction was conducted at room temperature while stirring the reaction mixture. After 2 hours the reaction mixture was diluted with water to provide a solution containing 10 weight percent oligomer. Also, hydrolyzed polyvinyl alcohol (1 g; 0.005 mole) was added in forming the primer solution.

EXAMPLE V

The run described in Example IV was repeated except that a water soluble anti-corrosion agent was added. Thus, 2,4-diamino-s-triazine (0.5 g; 0.004 mole) was added to the primer solution along with the polyvinyl alcohol.

EXAMPLE VI

The run described in Example IV was repeated except that ammonium hydroxide was included in the reaction mixture as a catalyst. Thus, ammonium hydroxide (3.5 g; 0.1 mole) was added to the reaction medium containing resorcinol and formaldehyde.

EXAMPLE VII

A run was conducted in which phenol (18.8 g; 0.2 mole) was reacted in water with formaldehyde (13.5 g of 37% Formalin; 0.167 mole) in the presence of phosphoric acid (2.1 g; 0.06 mole). Hydrolyzed polyvinyl alcohol (3 g; 0.015 mole) was added to the reaction mixture. The reaction was carried out at 150° F. while stirring the reaction mixture. After 1 hour, additional formaldehyde (0.2 mole) was added, and the reaction mixture was diluted with water to provide a solution containing 10 weight percent oligomer. The reaction mixture was allowed to cool to room temperature, thereby providing the primer solution.

EXAMPLE VIII

A run was carried out in which phenol (37.6 g; 0.4 mole) was reacted with formaldehyde (42 g of 37% Formalin; 0.52 mole) in the presence of ammonium hydroxide (3.5 g; 0.1 mole). The reaction was conducted at 175° F. while stirring the reaction mixture. After 1 hour the reaction mixture was diluted with water to give a solution containing 10 weight percent oligomer. Also, hydrolyzed polyvinyl alcohol (6 g; 0.03 mole) was added in forming the primer solution.

EXAMPLE IX

A run was carried out in which resorcinol (22.8 g; 0.2 mole), phenol (18.8 g; 0.2 mole) and formaldehyde (24 g of 37% Formalin; 0.3 mole) were reacted in water solution. The phenol and formaldehyde were partially reacted prior to addition of the resorcinol. The reaction was conducted at room temperature while stirring the mixture. After 2 hours the solution was diluted with water to provide a solution containing 10 weight percent oligomer. Also, additional formaldehyde (0.2 mole) was added in forming the primer solution. Polyvinyl alcohol (1 g; 0.005 mole) and guanadine dichromate (0.5 g; 0.001 mole) were added with stirring to the primer solution.

EXAMPLE X

The run described in Example IX was repeated except that 42 g of 37% Formalin (0.52 mole formaldehyde) was utilized. Also, additional formaldehyde was not added to the solution as was done in the run of Example IX.

EXAMPLE XI

A run was conducted in which primer solutions prepared as described above were applied to aluminum strips. The strips had been cleaned and pretreated with either the Forest Products Laboratory (FPL) etch or a 10 volt phosphoric acid anodize. The primers were applied by a dipping procedure whereby the strips had a cured primer thickness of about 0.2 mils. The primers were cured by air drying at room temperature and by forced air drying at 120° F.

Adhesive bonds were prepared using ASTM lap shear specimens, primed as described above, and FM123 epoxy tape adhesive (0.085 psf). A control run was conducted in which an aluminum specimen was used that had been primed with a conventional organic solvent based primer (BR127). The adhesive bonds were subjected to the wedge opening test (ASTM No. 03762) and the tensile shear test (ASTM No. D-897-49). The results obtained in the test are shown below in the table.

TABLE

| Primer | Wedge Opening Test[1] Crack Extension, in | | | | Tensile shear, psi[1] | | | |
|---|---|---|---|---|---|---|---|---|
| | | | | | Unexposed | | Exposed 30 days 120° F., 95% RH | |
| | 1 hr[1] | 24 hr[2] | 1 hr[3] | 24 hr[3] | RT | 180° F. | RT | 180° F. |
| Control | .1 | .1 | .1 | .1 | 4500 | 3000 | 4100 | 1500 |
| Ex. II | .1 | .1 | .1 | .1 | 3892 | 2800 | 3000 | 1300 |
| Ex. IV | .1 | .15 | .15 | .15 | 4000 | 2700 | 3800 | 1400 |
| Ex. IX | .1 | .1 | .15 | .2 | 3864 | 2300 | 3589 | 1488 |

[1]The values shown each represent the average of values for 5 test specimens.
[2]Surface preparation: 10V anodise.
[3]Surface preparation: FPL etch.

EXAMPLE XII

The primers of this invention used in Example XI were applied to previously cleaned aluminum strips and oven cured for 1 hour at 250° F. The coated strips and uncoated strips (controls) as well as strips coated with commercial primers (controls) were placed in tap water and examined periodically for a period of 2 years. The specimens coated with primers of this invention showed no change in appearance while the uncoated specimens were completely disintegrated by corrosion. The specimens coated with commercial primers showed spots of corrosion and blister formation.

As seen from the foregoing, the present invention provides primers having adhesion properties comparable to those of conventional commercial primers. Of particular importance, as contrasted to conventional primers, the present primers do not upon curing release harmful hydrocarbons into the atmosphere. Furthermore, the cured primer coatings are extremely resistant to corrosion, thereby providing superior protection to aluminum surfaces.

As will be evident to those skilled in the art, modifications of the present invention can be made in view of the foregoing disclosure without departing from the spirit and scope of the invention. For example, while the primers have been indicated to be particularly suitable for use with aluminum, they can also be employed as adhesive and paint primers and protective coatings for other metals and metal alloys as well as non-metallic adherends, such as glass and plastics.

I claim:

1. A primer for aluminum or aluminum alloys consisting essentially of an aqueous solution of a water soluble condensation product of (1) phenol, resorcinol or a mixture of phenol and resorcinol and (2) formaldehyde, said solution being free of alkaline materials which corrode aluminum.

2. The primer according to claim 1 in which the aqueous solution contains about 5 to 15 weight percent of the condensation product.

3. The primer according to claim 2 which contains about 1 to 10 weight percent polyvinyl alcohol, based upon the weight of the condensation product.

4. The primer according to claim 3 which contains about 1 to 25 weight percent guanadine dichromate, acetoguanadine dichromate or 2,4-diamino-s-triazine, based upon the weight of the condensation product.

5. A process for preparing a primer for aluminum or aluminum alloys which comprises reacting a phenolic material selected from the group consisting of phenol, resorcinol and a mixture of phenol and resorcinol with formaldehyde, the reaction being conducted in a water medium in the absence of alkaline catalysts which corrode aluminum and under conditions such as to obtain a water soluble condensation product; and diluting the reaction mixture with an amount of water sufficient to provide a solution containing about 5 to 15 weight percent condensation product.

6. The process according to claim 5 in which the mole ratio of formaldehyde to phenolic material ranges from about 0.55 to 1.4:1.

7. The process according to claim 6 in which the reaction is conducted at a temperature ranging from about room temperature to 175° F.

8. The process according to claim 7 in which the reaction is conducted at room temperature.

9. The process according to claim 7 in which the reaction is conducted in the presence of a catalytic amount of ammonium hydroxide or phosphoric acid.

10. The process according to claim 7 in which about 1 to 10 weight percent polyvinyl alcohol and about 1 to 25 weight percent of an anti-corrosion agent selected from the group consisting of guanadine dichromate, acetoguanadine dichromate and 2,4-diamino-s-triazine, both amounts based upon the weight of the formaldehyde and phenolic material, are added to the reaction mixture.

* * * * *

UNITED STATES PATENT AND TRADEMARK OFFICE
CERTIFICATE OF CORRECTION

PATENT NO. : 4,238,379

DATED : December 9, 1980

INVENTOR(S) : Theodore J. Reinhart, Jr.

It is certified that error appears in the above—identified patent and that said Letters Patent are hereby corrected as shown below:

Col 5, under TABLE, change "1 hr$^{(1)}$" to --- 1 hr$^{(2)}$ ---.

Signed and Sealed this

Seventh Day of April 1981

[SEAL]

*Attest:*

RENE D. TEGTMEYER

*Attesting Officer*  *Acting Commissioner of Patents and Trademarks*